US012093459B2

(12) United States Patent
Miyawaki et al.

(10) Patent No.: US 12,093,459 B2
(45) Date of Patent: Sep. 17, 2024

(54) INFORMATION PROCESSING APPARATUS, INFORMATION PROCESSING METHOD, AND NON-TRANSITORY COMPUTER READABLE MEDIA STORING A PROGRAM

(71) Applicant: THE UNIVERSITY OF TOKYO, Tokyo (JP)

(72) Inventors: Mamoru Miyawaki, Tokyo (JP); Hiroyuki Shinoda, Tokyo (JP); Takaaki Kamigaki, Tokyo (JP); Mitsuru Ito, Tokyo (JP); Tao Morisaki, Tokyo (JP); Shun Suzuki, Tokyo (JP); Atsushi Matsubayashi, Tokyo (JP); Ryoya Onishi, Tokyo (JP); Yasutoshi Makino, Tokyo (JP); Seki Inoue, Tokyo (JP)

(73) Assignee: THE UNIVERSITY OF TOKYO (JP)

(*) Notice: Subject to any disclaimer, the term of this patent is extended or adjusted under 35 U.S.C. 154(b) by 0 days.

(21) Appl. No.: 18/077,393

(22) Filed: Dec. 8, 2022

(65) Prior Publication Data

US 2024/0111366 A1   Apr. 4, 2024

(30) Foreign Application Priority Data

Sep. 29, 2022   (JP) ................................ 2022-156628

(51) Int. Cl.
*G06F 3/01* (2006.01)
*A63F 13/285* (2014.01)
(Continued)

(52) U.S. Cl.
CPC .............. *G06F 3/016* (2013.01); *G06F 3/011* (2013.01); *G06F 3/165* (2013.01); *G06F 3/167* (2013.01);
(Continued)

(58) Field of Classification Search
CPC .......... G06F 3/016; G06F 3/011; G06F 3/165; G06F 3/167; G06F 3/04817;
(Continued)

(56) References Cited

U.S. PATENT DOCUMENTS

| 5,305,244 A | * | 4/1994 | Newman ................. G06F 1/163 |
| | | | 704/E15.045 |
| 2014/0184841 A1 | * | 7/2014 | Woo ....................... H04N 23/57 |
| | | | 348/218.1 |

(Continued)

FOREIGN PATENT DOCUMENTS

| JP | 2021-508115 A | 2/2021 |
| JP | 2021-159480 A | 10/2021 |

OTHER PUBLICATIONS

Tao Morisaki, Masahiro Fujiwara, Yasutoshi Makino, and Hiroyuki Shinoda, "Midair Haptic-Optic Display with Multi-Tactile Texture based on Presenting Vibration and Pressure Sensation by Ultrasound", SIGGRAPH Asia 2021, Emerging Technologies, pp. 1-2, Tokyo, Japan, Dec. 14-17, 2021.

(Continued)

*Primary Examiner* — Douglas M Wilson
(74) *Attorney, Agent, or Firm* — Harness, Dickey & Pierce, P.L.C.

(57) ABSTRACT

An information processing apparatus comprises a processor configured to execute a program so as to: acquire viewpoint information, motion information and object information; process an object image wherein: the object image is an image representing a virtual substance and is updated based on the viewpoint information and the motion information; calculate a position when superimposing a background image and the object image, wherein: the background image is an image according to the field of view of the user; generate visual information superimposing the background image and the object image based on the position calculated, (Continued)

and output the generated visual information to a display device; and generate tactile information for an ultrasound generator irradiating the user with ultrasound corresponding to the object based on the position calculated, the motion information and the object information, and output the generated tactile information to the ultrasound generator.

19 Claims, 14 Drawing Sheets

(51) Int. Cl.
| | |
|---|---|
| *G06F 3/04817* | (2022.01) |
| *G06F 3/0484* | (2022.01) |
| *G06F 3/16* | (2006.01) |
| *G06T 7/20* | (2017.01) |
| *G06T 7/40* | (2017.01) |
| *G06T 7/70* | (2017.01) |
| *G06T 11/00* | (2006.01) |
| *G08B 6/00* | (2006.01) |

(52) U.S. Cl.
CPC .............. *G06T 7/20* (2013.01); *G06T 7/70* (2017.01); *G06T 11/00* (2013.01); *A63F 13/285* (2014.09); *A63F 2300/8082* (2013.01); *G06F 3/04817* (2013.01); *G06F 3/0484* (2013.01); *G06T 7/40* (2013.01); *G06T 2207/30196* (2013.01); *G08B 6/00* (2013.01)

(58) Field of Classification Search
CPC . G06F 3/0484; G06T 7/20; G06T 7/70; G06T 11/00; G06T 2207/30196; G06T 7/40; A63F 13/285; A63F 2300/8082; G08B 6/00

See application file for complete search history.

(56) References Cited

U.S. PATENT DOCUMENTS

| | | | |
|---|---|---|---|
| 2015/0258432 A1* | 9/2015 | Stafford | A63F 13/426 463/32 |
| 2016/0350973 A1* | 12/2016 | Shapira | G06F 3/011 |
| 2017/0068213 A1* | 3/2017 | Rhee | G03H 1/2294 |
| 2020/0218354 A1* | 7/2020 | Beattie | G06T 7/41 |
| 2022/0016673 A1* | 1/2022 | Lee | G06F 3/011 |
| 2022/0198892 A1* | 6/2022 | Carter | G10K 15/04 |

OTHER PUBLICATIONS

Tao Morisaki, Masahiro Fujiwara, Yasutoshi Makino, and Hiroyuki Shinoda, "Displaying Pressure Sensation Distribution by Repetitively Moving Airborne Ultrasound Focus" Proceedings of the 22nd Conference of the Society of Instrument and Control Engineers, Systems Integration Division, pp. 1926-1931, (held online), Dec. 15-17, 2021.

Onishi, Ryoya, Kamigaki, Takaaki, Suzuki, Shun, Morisaki, Tao, Fujiwara, Masahiro, Makino, Yasutoshi, and Hiroyuki Shinoda. "Visualization of airborne ultrasound field using thermal images." arXiv, (2022). https://doi.org/10.48550/arXiv.2203.07862 (13 pages).

* cited by examiner

INFORMATION PROCESSING APPARATUS, INFORMATION PROCESSING METHOD, AND NON-TRANSITORY COMPUTER READABLE MEDIA STORING A PROGRAM

CROSS REFERENCE TO RELATED APPLICATIONS

The present application claims priority under 35 U.S.C. § 119 to Japanese Patent Application No. 2022-156628, filed Sep. 29, 2022, which is expressly incorporated by reference herein in its entirety.

BACKGROUND

Technical Field

The present invention relates to an information processing apparatus, an information processing method and a non-transitory computer-readable media storing a program.

Related Art

In recent years, an opportunity for using augmented reality (AR), virtual reality (VRE) and mixed reality (MR) has become increasing. These technologies are to be used for displaying images to a vision of a user. On the other hand, these technologies are also desired to present a tactile for the user. Some technologies using ultrasound has been proposed for a tactile presentation, for example, in Japanese Patent Application Publication No. 2021-508115.

By the way, when tactile information is presented together with visual information, it is difficult to use presented tactile sensation for recognizing a shape of an object from the tactile sensation or manipulating the object from the tactile sensation in the case where the tactile sensation is presented simply enough for a user to confirm whether or not the object exists.

In view of the above circumstances, the present invention provides an information processing apparatus, an information processing method and a non-transitory computer-readable media storing a program that can configure a system capable of recognizing a shape and the like of an object from tactile sensation.

According to an aspect of the present invention, an information processing apparatus is provided. The information processing apparatus comprises a processor configured to execute a program so as to: as an information-acquiring unit, acquire viewpoint information, motion information and object information, wherein: the viewpoint information includes information indicating a field of view of a user, the motion information is information indicating a motion of an irradiation target with ultrasound, and the object information includes at least one of coordinates, shape, surface condition, solidity, temperature, mass and friction coefficient of the object; as an image-processing unit, process an object image wherein: the object image is an image representing a virtual substance and is updated based on the viewpoint information and the motion information; as a position-processing unit, calculate a position when superimposing a background image and the object image, wherein: the background image is an image according to the field of view of the user; as a visual-information-generating unit, generate visual information superimposing the background image and the object image based on the position calculated by the position-processing unit, and output the generated visual information to a display device; and as a tactile-information-generating unit, generate tactile information for an ultrasound generator irradiating the user with ultrasound corresponding to the object based on the position calculated by the position-processing unit, the motion information and the object information, and output the generated tactile information to the ultrasound generator.

According to one aspect of the invention, it is possible to recognize the shape and the like of an object from tactile sensation.

DETAILED DESCRIPTION

Hereinafter, embodiments of the present invention will be described with reference to the drawings. Various features described in the embodiment below can be combined with each other.

A program for realizing a software in the present embodiment may be provided as a non-transitory computer-readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of a circuit, a circuitry, a processor, a memory, and the like. In other words, it is a circuit which includes application specific integrated circuit (ASIC), programmable logic device (e.g., simple programmable logic device (SPLD), complex programmable logic device (CPLD), and field programmable gate array (FPGA)), and the like.

1. Total Configuration

Figure 1:
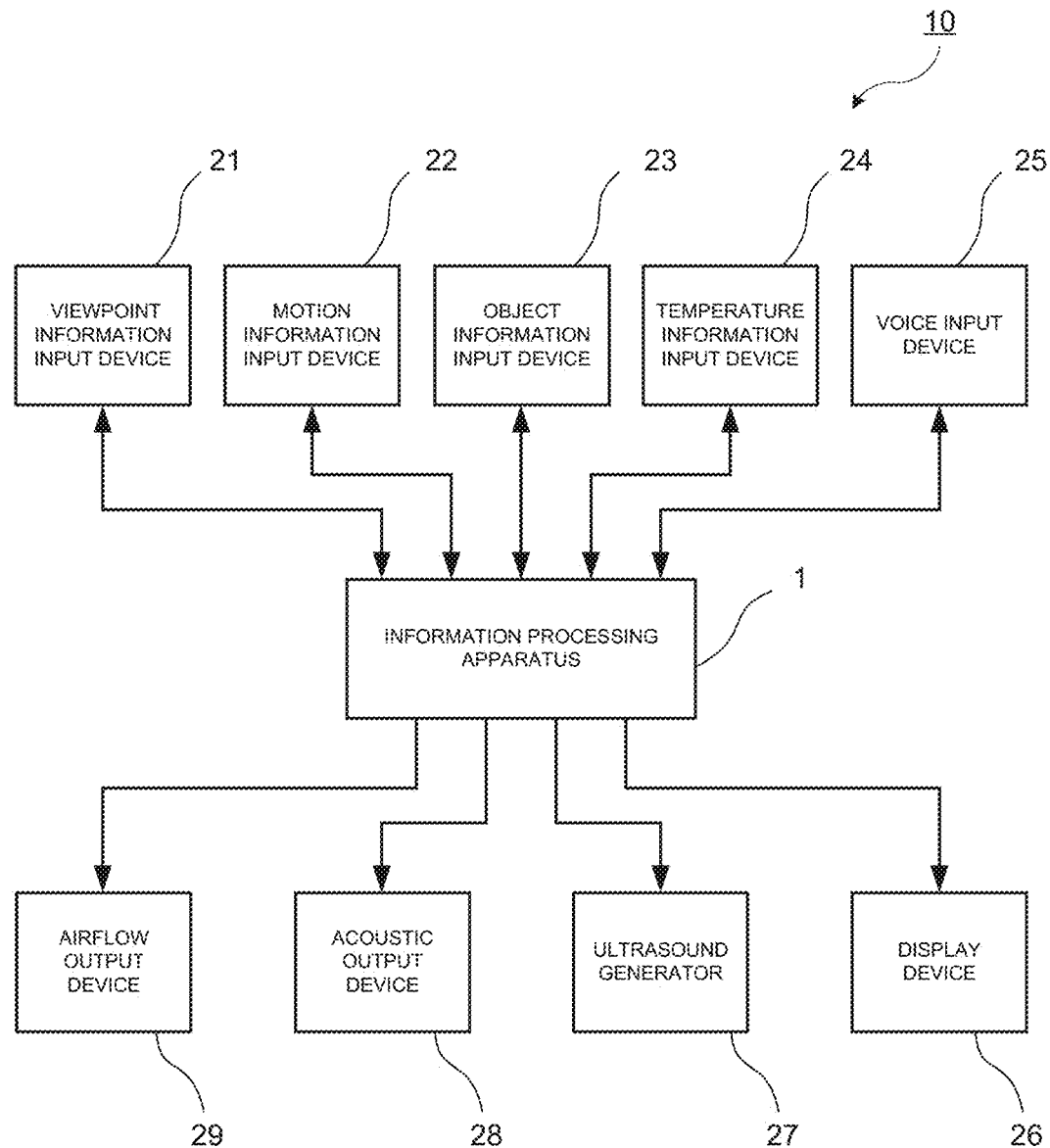
FIG. 1 shows an example of a configuration of a system 10 including an information processing apparatus 1 according to an embodiment of the present invention.

FIG. 1 shows an example of a configuration of a system 10 including an information processing apparatus 1 according to an embodiment of the present invention. As shown in FIG. 1, the system 10 is configured by connecting a viewpoint information input device 21, a motion information input device 22, an object information input device 23, a temperature information input device 24, a voice input device 25, a display device 26, an ultrasound generator 27, an acoustic output device 28 and an airflow output device 29 to the information processing apparatus 1. Each of these devices may be connected to each other by means of communication means and may be distributed. The system 10 may also be configured in such a manner that a plurality of systems equivalent to the system 10 are connected to each other by communication means, thereby mutually interacting.

The viewpoint information input device 21 is configured to input viewpoint information indicating a field of view of a user to the information processing apparatus 1. The viewpoint information input device 21 is, for example, a camera. This viewpoint information input device 21 may be configured to follow the motion of the user and to change the posture and the position thereof, which may be realized, for example, by uniting with an actuator.

The motion information input device 22 is configured to input the motion of a user or a substance, which is an irradiation target with ultrasound to the information processing apparatus 1 as motion information. The motion of a user is specifically the motion of an exposed part of a skin such as a hand including a thumb or a finger and a face of the user. The motion of a substance is specifically the motion of the substance which can be a passive actuator. The motion information input device 22 is, for example, a sensor such as a camera. This motion information input device 22 may follow the motion of the user and change the posture and the position thereof, which may be realized, for example, by uniting with an actuator.

The object information input device 23 is configured to input object information to the information processing apparatus 1. The object information indicates an object to be virtually displayed. The object information input device 23 is, for example, a server that can communicate with the information processing apparatus 1 via a network and the like.

The temperature information input device 24 is configured to input temperature information indicating the temperature of the surface which is an irradiation target with ultrasound. The temperature information input device 24 is, for example, a thermal camera. This temperature information input device 24 may be configured to follow the motion of the user and change the posture and the position thereof, which may be realized, for example, by uniting with an actuator. The temperature information input device 24 may be omitted.

The voice input device 25 is configured to input an instruction given by a voice of the user. The voice input device 25 is, for example, a microphone. The voice input device 25 may be configured to follow the motion of the user and to change the posture and the position thereof, which may be realized, for example, by uniting with an actuator. The voice input device 25 may be omitted.

The display device 26 is configured to display AR, VR, MR, and the like. The display device 26 is, for example, an display. The type of this display may be a stationary type, a goggle type worn by the user, or a portable type such as a smartphone or a tablet. The display device 26 may follow the motion of the user and change the posture and the position thereof, which may be realized, for example, by uniting with an actuator. The image displayed by the display device 26 includes video or moving images and the like.

The ultrasound generator 27 is configured to irradiate with ultrasound an exposed part of a skin of the user (for example, a hand, a finger, an arm, or a face) or a substance which is configured to move by irradiating the ultrasound. The ultrasound generator 27 is, for example, a transducer array. The ultrasound generator 27 may follow the motion of the user and change the posture and the position thereof, which may be realized, for example, by uniting with an actuator.

The sound output device 28 is configured to generate a sound effect and the like, and is, for example, a speaker. The sound output device 28 may follow the motion of the user and change the posture and the position thereof, which may be realized, for example, by uniting with an actuator. The sound output device 28 may be omitted.

The airflow output device 29 is configured to generate airflow to give the user a presence, and is, for example, a blower. This airflow output device 29 may follow the motion of the user and change the posture and the position thereof, which may be realized, for example, by uniting with an actuator. It is also possible to use a fan, circulator, or other devices that can be remotely controlled by a remote controller as the airflow output device 29. The airflow output device 29 can be omitted. The ultrasound generator 27 is used for controlling the airflow as the airflow output device 29 by controlling the airflow through appropriate control of a spatio-temporal distribution of ultrasound.

2. Configuration of an Information Processing Apparatus

Figure 2:
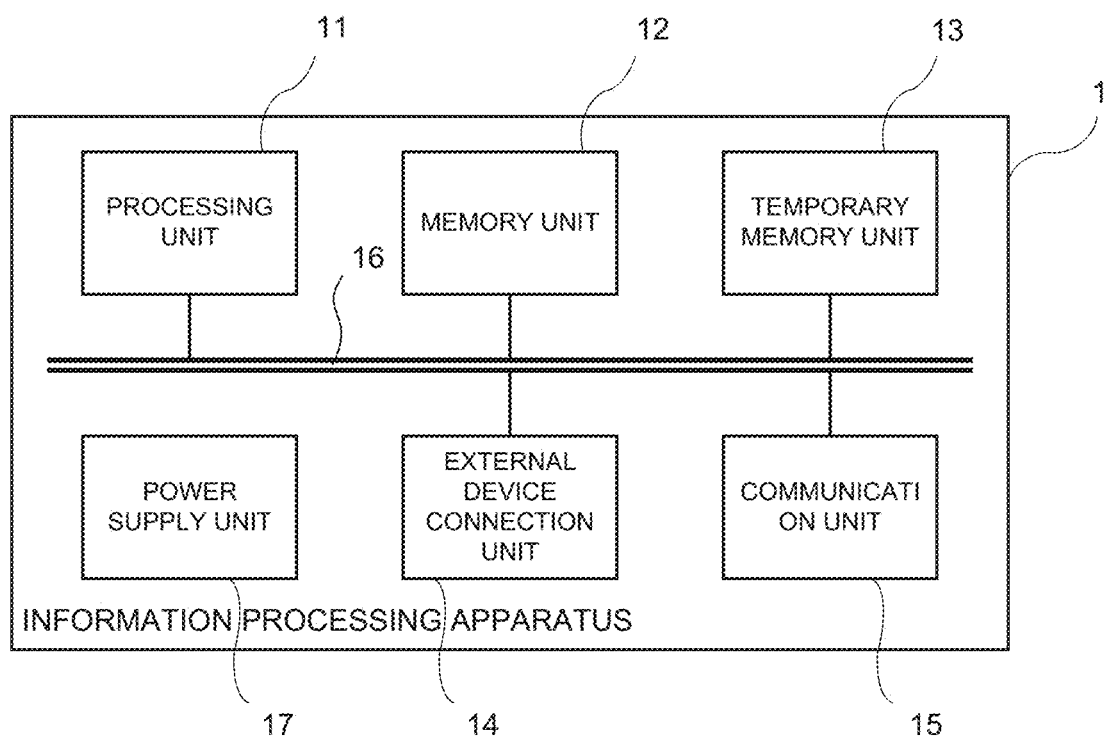
FIG. 2 shows a configuration of an information processing apparatus 1.

Next, a configuration of the information processing apparatus 1 will be illustrated. FIG. 2 shows a configuration of an information processing apparatus 1. As shown in FIG. 2, the information processing apparatus 1 comprises a processing unit 11, a memory unit 12, a Temporary memory 13, an external device connection unit 14 and a communication unit 15. These components are electrically connected inside the information processing apparatus 1 via a communication bus 16. The information processing apparatus 1 also comprises a power supply unit 17.

The processing unit 11 can be realized by, for example, a central processing unit (CPU) which operates according to a predetermined program stored in the memory unit 12, a programmable logic circuit configured in accordance with a predetermined program stored in the memory unit 12, or a combination thereof. The processing unit 11 is realized by, for example, a central processing unit (CPU) operating in accordance with a predetermined program stored in the memory unit 12, a programmable logic circuit configured in accordance with a predetermined program stored in the memory unit 12 or a combination thereof, thereby realizing various functions.

The memory unit 12 is a non-transitory computer-readable media storing various information. The memory unit 12 can be realized by a storage device such as, for example, a hard disk drive (HDD), a solid-state drive (SSD) and the like. The memory unit 12 can be located in another device that can communicate with the information processing apparatus 1.

The temporary memory 13 is a volatile storage media. The temporary memory unit 13 can be realized by a memory such as, for example, a random access memory (RAM), and the like. The temporary memory unit 13 stores information which is necessary for the processing unit 11 to operate (arguments, sequences and the like).

The external device connection unit 14 is a connector in accordance with a regulation such as, for example, a universal serial bus (USB) and High-Definition Multimedia Interface (HDMI (registered trademark)), and can be connected to an input device such as a keyboard and a display device such as a monitor. The viewpoint information input device 21, the motion information input device 22, the temperature information input device 24, the voice input device 25, the display device 26, the ultrasound generator 27, the acoustic output device 28, the airflow output device 29 and the like are connected to the external device connection unit 14.

The communication unit 15 is communication means in accordance with, for example, a local area network (LAN) standard, and realizes communication between the information processing apparatus 1 and a network such as a local area network or the Internet via the local area network. The object information input device 23 and an information processing device and the like, same as or similar to the information processing apparatus 1 are communicably connected to this network. The viewpoint information input device 21, the motion information input device 22, the temperature information input device 24, the voice input device 25, the display device 26, the ultrasound generator 27, the acoustic output device 28, the airflow output device 29 and the like may be connected to this network.

The power supply unit 17 is configured to supply electrical energy obtained from a commercial power source, battery, or other sources to the viewpoint information input device 21, the motion information input device 22, the temperature information input device 24, the voice input device 25, the display device 26, the ultrasound generator 27, the sound output device 28, the airflow output device 29 and the like If a device to which electrical energy is supplied is connected by a wire via the external device connection unit 14, the electrical energy is supplied using said wire. Instead of supplying the electric energy by wired connection, the electric energy may be supplied by a wireless power supply system. If a device to which electric energy is supplied is connected wirelessly, electric power is supplied via a wireless power supply system. Of course, in the case where the viewpoint information input device 21, the motion information input device 22, the temperature information input device 24, the voice input device 25, the display device 26, the ultrasound generator 27, the acoustic output device 28, the airflow output device 29 and the like include a battery or are powered by a commercial power source, it is not necessary to supply power from the power supply unit 17 to said device. The power supply unit 17 may be integrated with any or all of the battery, the wireless power supply system, and the other devices A computer such as a personal computer and the like can be used as the information processing apparatus 1, and it is also possible to configure the information processing apparatus 1 using a plurality of computers.

3. Function of the Information Processing Apparatus 1

Next, a function of the information processing apparatus 1 will be illustrated. The information processing apparatus 1 is configured to generate a visual sensation and tactile sensation, or only tactile sensation, for a user based on inputted information, and realize each of the functional units described later by operating according to a program. This program allows a computer to operate or function as an information processing apparatus.

Figure 3:
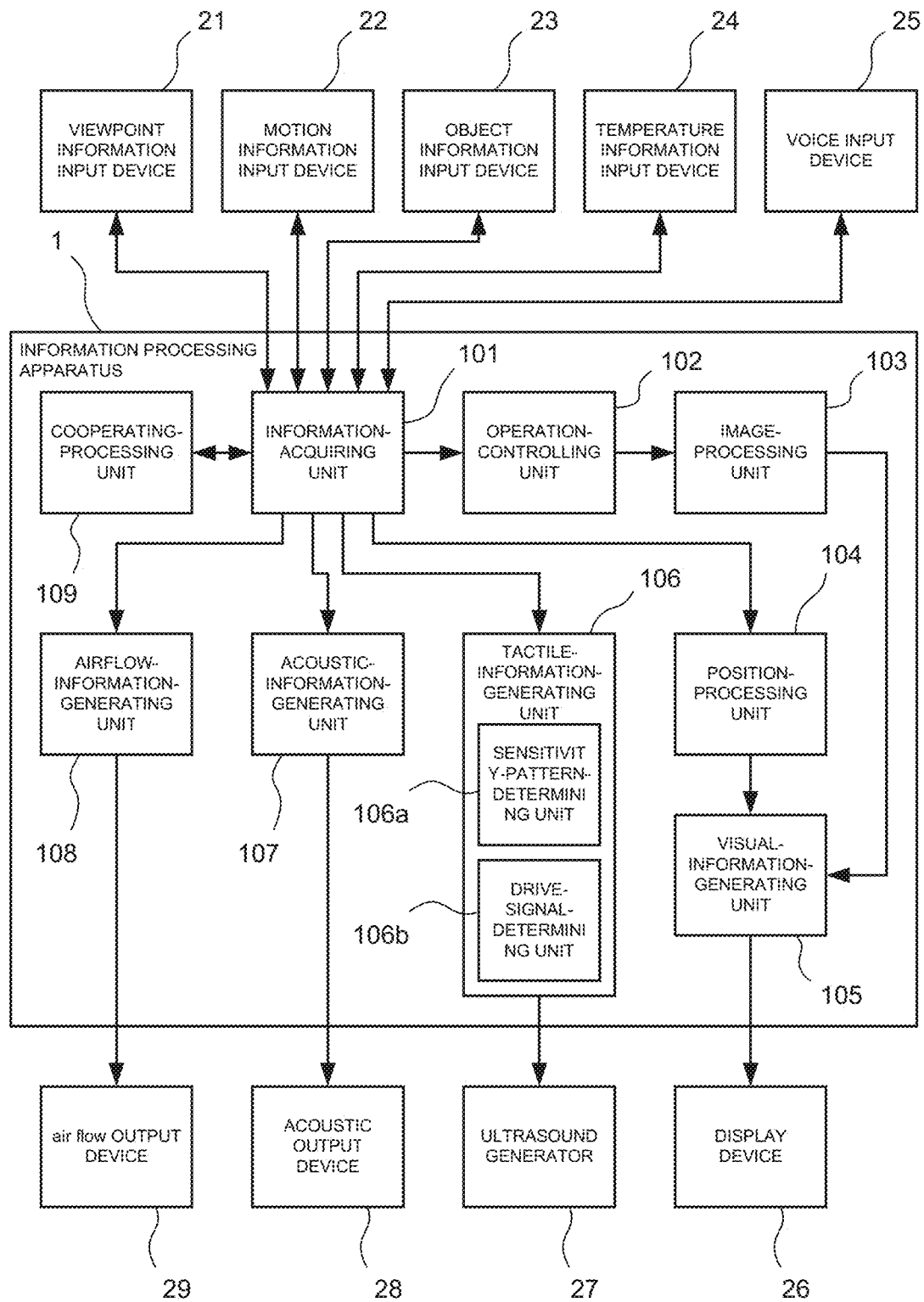
FIG. 3 is a block diagram showing a functional configuration of an information processing apparatus 1.

FIG. 3 is a block diagram showing a functional configuration of an information processing apparatus 1. As shown in FIG. 3, the information processing apparatus 1 comprises an information-acquiring unit 101, an operation-controlling unit 102, an image-processing unit 103, a position-processing unit 104, a visual-information-generating unit 105, a tactile-information-generating unit 106, an acoustic-information-generating unit 107, an airflow-information-generating unit 108 and a cooperating-processing unit 109.

The information-acquiring unit 101 is configured to acquire viewpoint information, motion information, object information, voice information and temperature information. The viewpoint information includes information indicating the field of view of a user, for example, an image captured by the viewpoint information input device 21, for example, a camera. The motion information is information indicating the motion of the irradiation target with ultrasonic, for example, the motion of the user or the motion of an object, and is input from the motion information input device 22. The object information includes at least one of coordinates, shape, surface condition, solidity, temperature, mass and friction coefficient of the object, preferably including the surface state of the object, such as texture, material and the like, and is input from the object information input device 23. The voice information indicates information with respect to voice uttered by a user and is input from the voice input device 25. However, the voice information is not essential. The temperature information is information indicating the temperature of the surface of the irradiation target, and is input from temperature information input device 24, for example, a thermal camera. Because the temperature of the surface of a target to which ultrasound is irradiated, such as an exposed part of a skin of a hand, a thumb, a finger, a face and the like, or the surface of a substrate, changes with the irradiation of ultrasound, the irradiation position and intensity of the ultrasound can be identified from the temperature change. This temperature change can be measured by using a thermal camera and can be estimated by using an infrared camera. It is not necessary to constantly measure the surface of the target with a thermal camera and the like. The measurement of the surface of the target may be configured to measure the surface of the target once and to correct the difference between the output of the sensor that measures the position, the position where the temperature change is observed by the thermal camera, and the position where the ultrasonic transducer should form the focus of the ultrasound. Instead of directly measuring the temperature of the surface of the target which is irradiated with ultrasonic, the measurement of the surface of the target may be configured to form a focus on, for example, a nylon polymer mesh and the like, to photograph the focus by a thermal camera and the like, and to correct the difference in comparison with the position where the ultrasonic transducer should form the focus of the ultrasound and the position where the temperature change is observed by the thermal camera.

Figure 4:
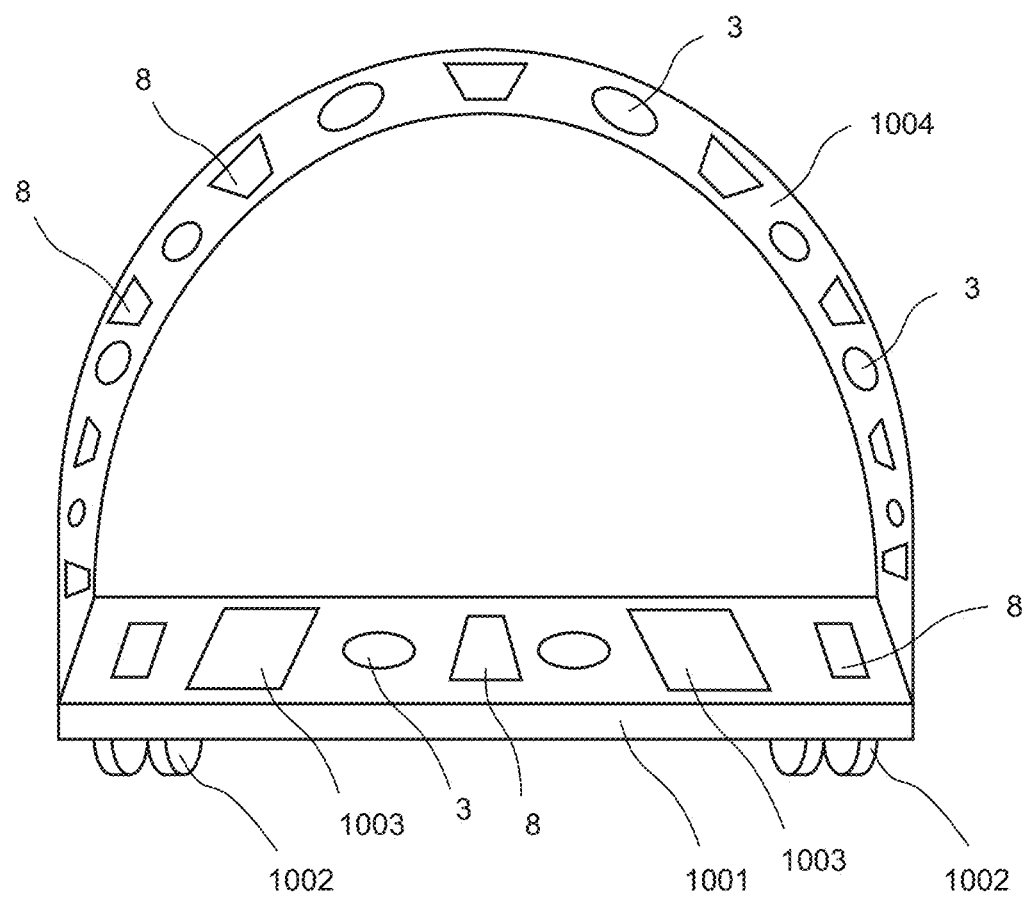
FIG. 4 shows an example of a configuration of a device including a motion information input device 22 and an ultrasound generator 27.
Figure 5:
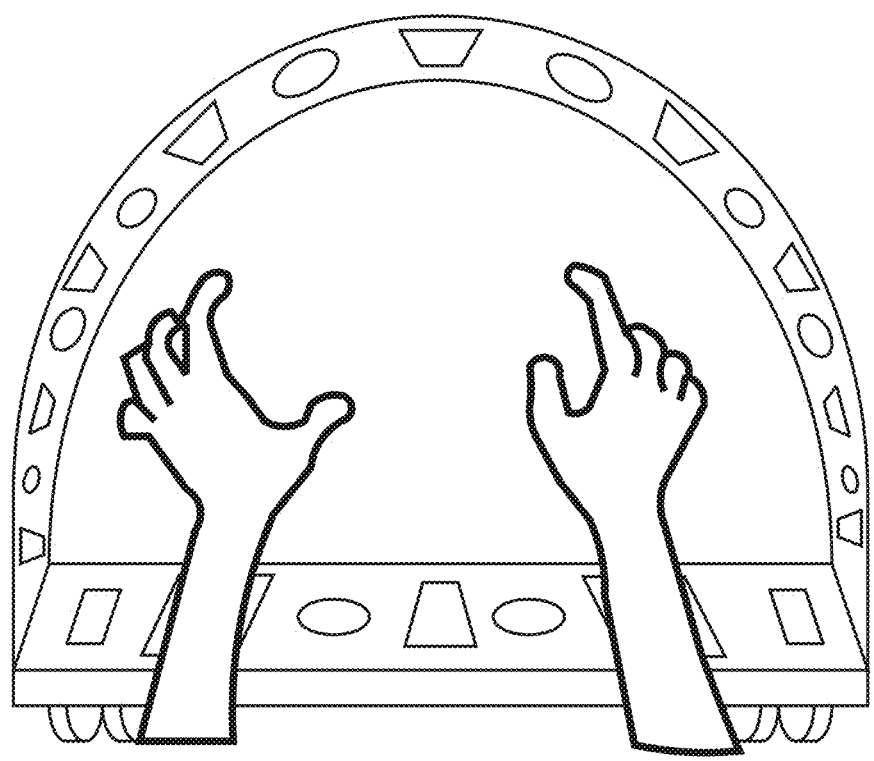
FIG. 5 shows an example of a use of the device shown in FIG. 4.

Here, an example of a configuration of the motion information input device 22 and the ultrasound generator device 27 is described. FIG. 4 shows an example of a configuration of a device including the motion information input device 22 and an ultrasound generator 27. The device shown in FIG. 4 comprises a stage 1001, a roller 1002, a contact pad 1003 and a ring-shaped substrate 1004. The stage 1001 and the ring-shaped substrate 1004 are provided with a plurality of the motion information input devices 22 and a plurality of the ultrasound generators 27, respectively. The stage 1001 is configured to be rotated by the rollers 1002 and is rotated by the motion of the arm or hand put on the contact pad 1003. The stage 1001, the rollers 1002 and the contact pad 1003 can be omitted. The device shown in FIG. 4 is used as shown in FIG. 5. FIG. 5 shows an example of a use of the device shown in FIG. 4.

The operation-controlling unit 102 is configured to control whether or not an operation of the object is performed by a user. For example, the operation-controlling unit 102 approves the operation in response to pressing the approval object and disapproves the operation in response to pressing the disapproval object. As described later, the approval object and the disapproval object are displayed as a virtual substance, as well as the object. The operation-controlling unit 102 may also control whether or not the operation is performed according to the voice information acquired by the information-acquiring unit 101. In the case where a plurality of users is viewing the same object, the control of whether or not the operation is performed by the operation-controlling unit 102, for example, is configured to limit which user can operate the object, thereby preventing a conflicting operation in such manner that one user tries to rotate the object to the right and another user tries to rotate the object to the left. When two users cooperate to pull the object together, whether or not the operation is performed can be controlled so as to allow the two users to perform the operation. Even when there is only one user, for example, in the case where an object is easily deformed, the operation-controlling unit 102 can disallow the operation for preventing the object from being deformed.

The image-processing unit 103 is configured to process a background image and an object image. The background image is an image according to a field of view of a user and is updated based on the viewpoint information. The background image may be an image captured by a camera, which is the viewpoint information input device 21, or may be a pre-captured or generated image. The image-processing unit 103 may also process a user image.

Figure 6:
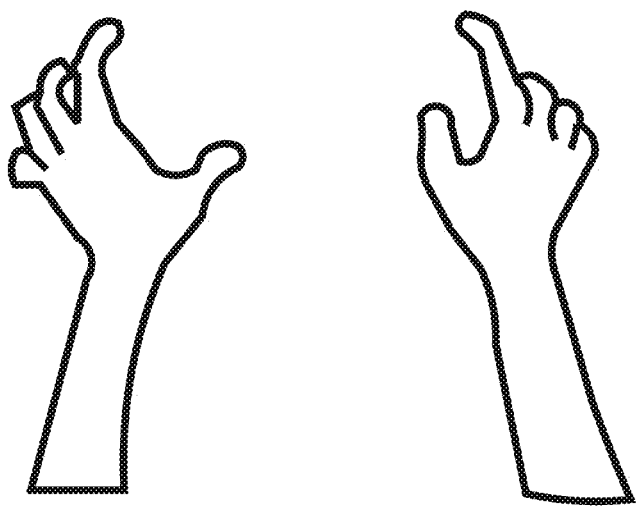
FIG. 6 shows an example of a user image.

The user image is used when the image is a pre-captured or generated image other than the image captured by a camera, which is the viewpoint information input device 21, and is an image representing a hand including a thumb or a finger of the user and is updated based on the motion information. The user image is configured, for example, as shown in FIG. 6. This user image is updated by the user moving the thumb, finger and the like of the user.

Figure 7:
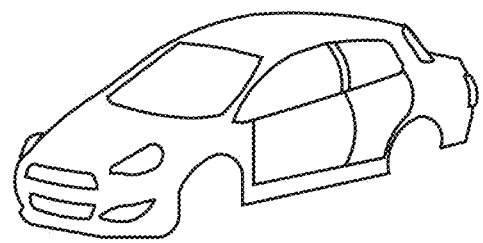
FIG. 7 shows an example of an object image.

The object image is an image representing a virtual substance and is updated based on viewpoint information and the motion information. For example, the object image is configured as shown in FIG. 7. This object image is updated in such a manner that the object becomes a state in which an operation including motion, rotation, deformation, division or combination is performed based on the motion information indicating the operation the user tries to operate the object. Of course, there is some object in which some operations such as dividing and the like, is prohibited. Hence, an operation other than those shown here, such as, for example, deleting a part of the object and the like, may also be performed.

The position-processing unit 104 is configured to calculate a position when superimposing the background image and the object image processed by the image-processing unit 103. It is, of course, unnecessary to superimpose the user image when the user image is not used. The object information may also include environment-corresponding information corresponding to each of a plurality of environments. In this case, the position-processing unit 104 can calculate a position when superimposing the background image and the object image so as to correspond to an environment corresponding to the field of view of a user, based on the environment-corresponding information and the viewpoint information. It results in a difference, for example, the object can be superimposed in an upright position on a flat surface and cannot be superimposed in an upright position on a surface with an obliquity greater than a certain degree.

Figure 8:
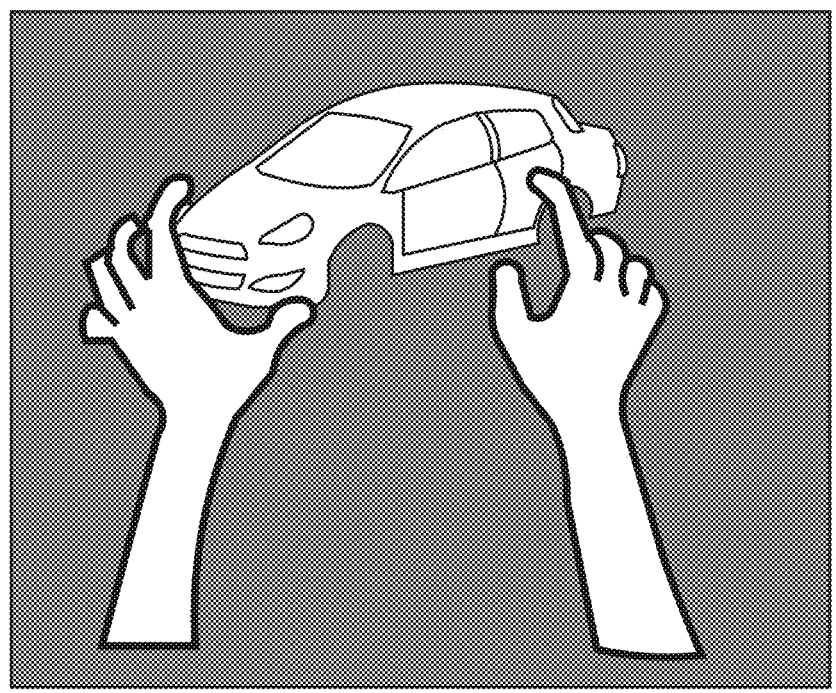
FIG. 8 shows an example of an image displayed on a display unit 7.

The visual-information-generating unit 105 is configured to generate visual information superimposing the background image processed by the image-processing unit 103, if necessary, the user image and the object image based on the position calculated by the position-processing unit 104, and output the generated visual information to a display device 26. The image displayed on the display device 26 based on the visual information generated by the visual-information-generating unit 105 is configured, for example, as shown in FIG. 8. In FIG. 8, the background is represented as a solid color for the sake of simplicity. This image is updated by a change in a viewpoint of a user or by an action of a user.

Figure 9:
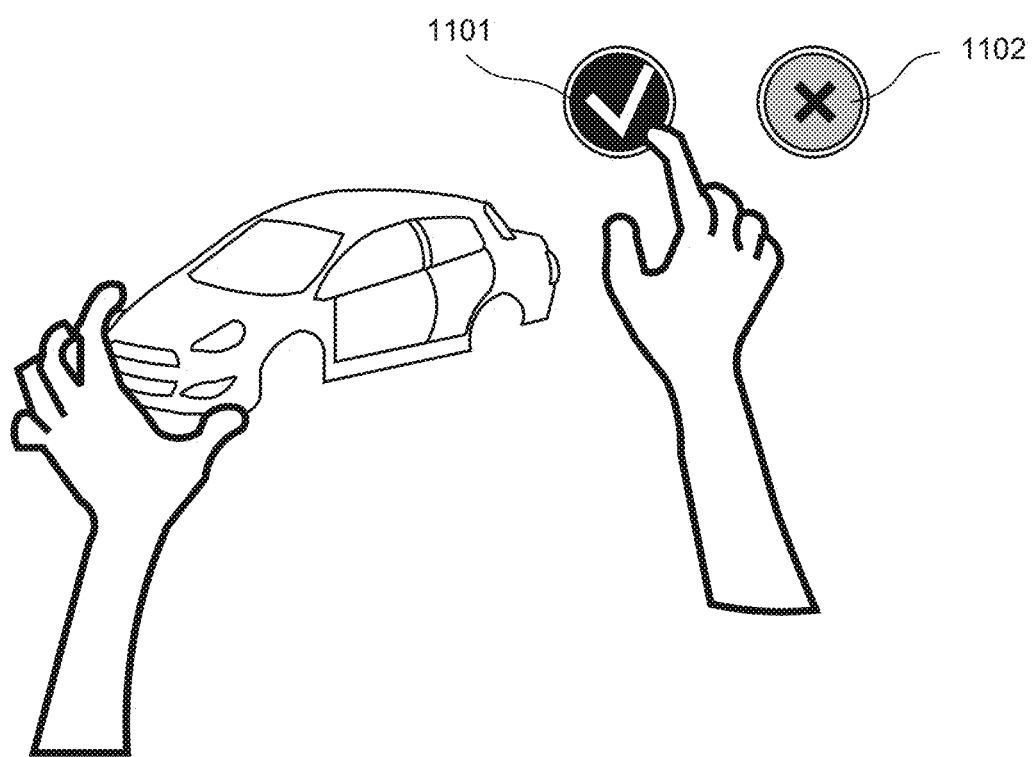
FIG. 9 shows an example of an image including an approval object and a disapproval object.
Figure 10:
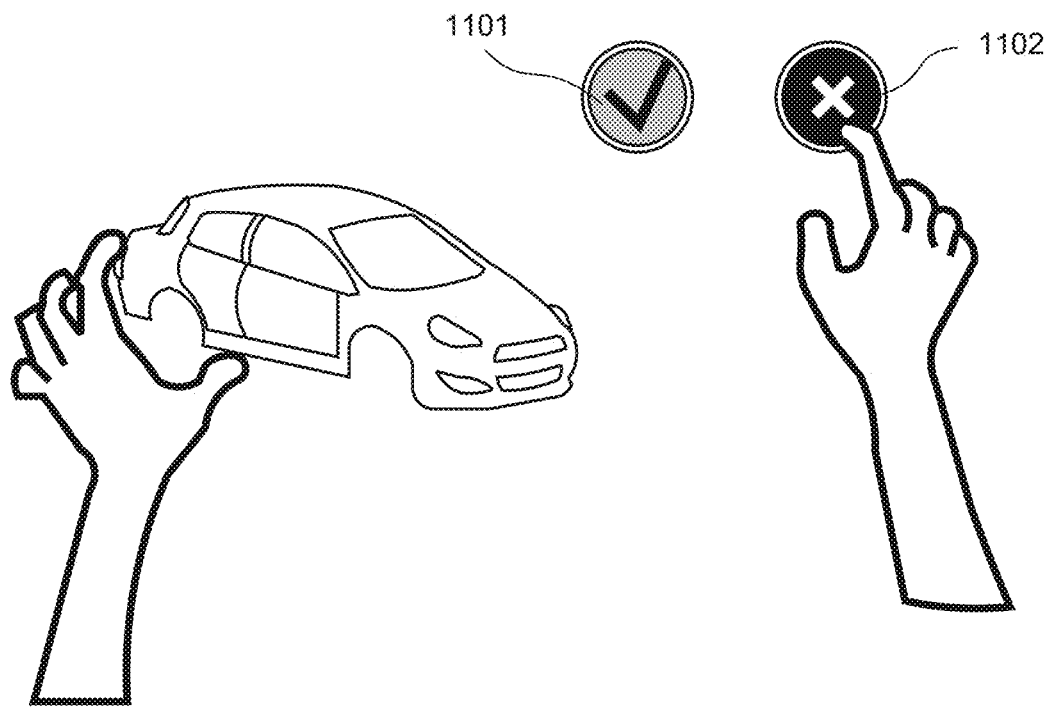
FIG. 10 shows an example of an image including an approval object and a disapproval object.

The visual-information-generating unit 105 can allow the visual information to include an approval object corresponding to approval of the operation and a disapproval object corresponding to disapproval of the operation. In other words, the image displayed on the display device 26 can include an approval object and a disapproval object. This image can be configured, for example, as shown in FIG. 9 and FIG. 10. FIG. 9 and FIG. 10 show examples of images including an approval object and a disapproval object. FIG. 9 shows an image immediately after an approval object 1101 is pressed, and FIG. 10 shows an image immediately after a disapproval object 1102 is pressed. The image shown in FIG. 10 is also the image which one user viewing the object from a position facing to another user viewing the image as shown in FIG. 9 is viewing.

The tactile-information-generating unit 106 is configured to generate tactile information for an ultrasound generator irradiating the user with ultrasound waves corresponding to the object based on the position calculated by the position-processing unit, the motion information and the object information, and output the generated tactile information to the ultrasound generator 27. Specifically, the tactile-information-generating unit 106 comprises a sensitivity-pattern-determining unit 106*a* and a drive-signal-determining unit 106*b* (referred to FIG. 3). The sensitivity-pattern-determining unit 106*a* determines a sensitivity pattern indicating the type of tactile sensation to be presented to the user that is determined by the object information or the application software described later. The type of tactile sensation is, for example, expressed in words such as "smooth," "rough" and the like The drive-signal-determining unit 106*b* generates a drive signal for determining a drive pattern of ultrasound irradiated to a user or a substrate that can be a passive actuator based on the tactile sensation determined by the sensitivity-pattern-determining unit 106*a*, the position calculated by the position-processing unit 104 and the motion information, and outputs the drive signal to the ultrasound generator 27.

Figure 11:
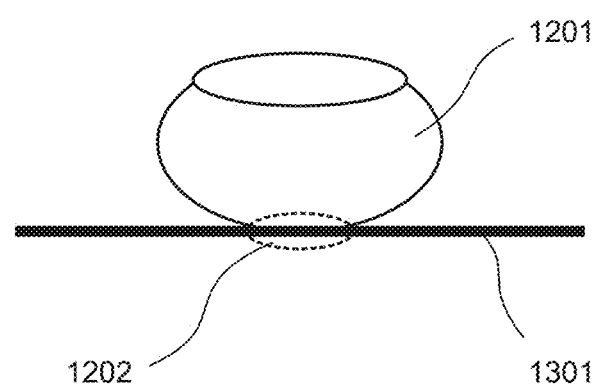
FIG. 11 shows an example of an irradiation position of ultrasound.
Figure 12:
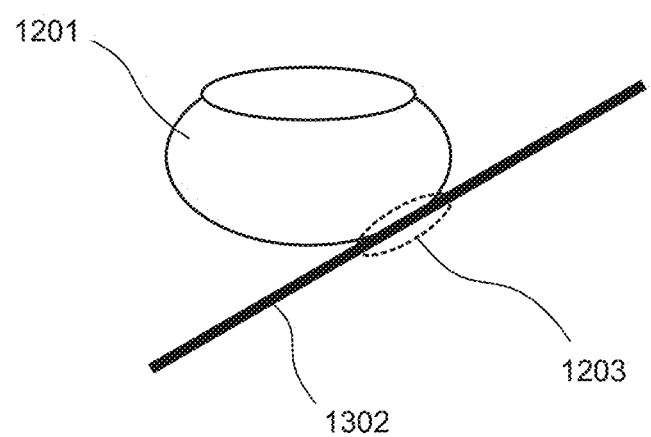
FIG. 12 shows an example of an irradiation position of ultrasound.

The driving signal as tactile information, has a temporal pattern in at least one of the following: the amplitude variation frequency of the ultrasound, the intensity, the phase, and the irradiation position. For example, a plurality of irradiation positions of ultrasound may exist as shown in FIG. 11 and FIG. 12. This temporal pattern can temporally change the irradiation position. This temporal pattern is also used to control the tactile sensation of the stimuli presented.

For example, changing the irradiation position at a higher frequency can, respectively, present a stimulus with a vibration sensation, and changing the irradiation position at a lower frequency presents a static stimulus (with almost no vibration).

FIG. 11 and FIG. 12 show examples of irradiation positions of ultrasound. The example shown in FIG. 11 shows that a finger 1201 of a user is irradiated with ultrasound at a site 1202 in such a manner that the user can feel a surface 1301, and the example shown in FIG. 12 shows that a finger 1201 of a user is irradiated with ultrasound at a site 1203 in such a manner the user can feel a surface 1302. The tactile sensation of the presented stimulus can also be changed according to contact stimulation with these surfaces. For example, the stimulation without strong vibration, which is described above, can be used to clearly present the contact angle with a surface.

Figure 13:
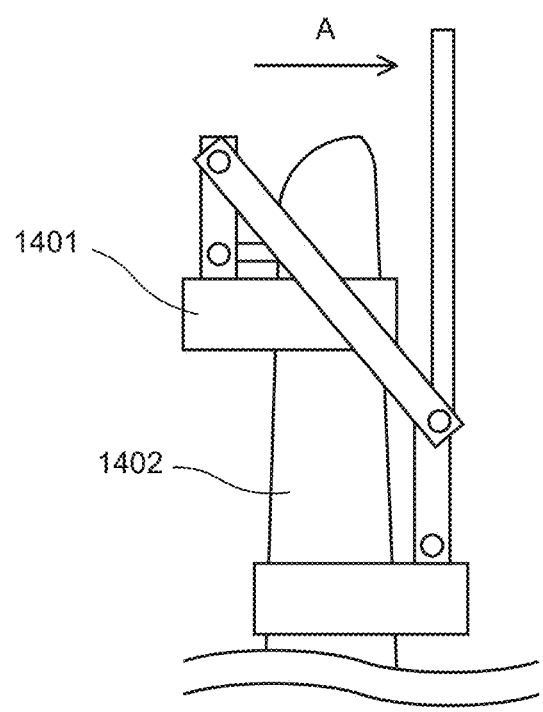
FIG. 13 shows an example of a passive actuator.

FIG. 13 shows an example of a passive actuator. An actuator 1401 shown in FIG. 13 is configured to be attached to a finger 1402 of a user. The actuator 1401 can present tactile sensation to the user by irradiating ultrasound in the direction of arrow A in FIG. 13. In this case, changing the irradiation pattern of ultrasound can present a vibration or a static force. The actuator 1401 can also be marked with a marker and the like at a position where ultrasound is irradiated. A passive actuator may include not only a substance worn on a finger such as the actuator 1401, but also include any substance in contact with a skin of people, such as a substance worn by people, for example, sunglasses and clothing, and a substance grasped by people, for example, a cup and a smartphone cover. Any of these passive actuators are configured to irradiate a passive mechanism with ultrasound. This passive mechanism driven by ultrasound may also be used in combination with a small battery or an electronic component.

The temporal pattern included in the tactile information is a pattern according to the shape of the object, or a pattern according to the surface state or material of the object. Controlling a spatio-temporal distribution of ultrasound can tactilely reproduce, and present to a user, characteristics of a substance such as softness, surface texture, mobility (weight), and temperature.

For example, in the aspect of softness, if the object is easily deformable such as clay, ultrasound is first irradiated to a certain site of a finger of a user, and then to a plurality of sites of the finger simultaneously, so that the user can feel the finger sink into the clay.

If the object is hard, the intensity of the ultrasound can be made stronger according to the force with which the user tries to push the finger into the object, so that the user can feel the finger not pushed in.

In the aspect of texture, for example, when a user lightly strokes the surface, changing a pattern of stimulus temporally according to the velocity of the finger and the surface state of the object (e.g., spatial wavelength) can present tactile sensation of stroking the surface of a specific substance. In the aspect of weight, for example, a temporal delay in moving the stimulus position compared to the motion of a fingertip can reproduce a heavy object (the object that is difficult to move). This temporal delay in moving the stimulus position can give the user an experience that the substance has not moved despite the force applied. On the other hand, if the stimulus position is followed completely without delay, a light object can be represented. The cold sensation of an object can be presented, for example, by simultaneously spraying mist at the position irradiated with ultrasound and vaporizing the mist. The heat sensation can be presented by attaching a structure that absorbs ultrasound, for example, a structure with a void pattern that is sufficiently smaller than the wavelength of the ultrasound or a mesh material, at the irradiation position of ultrasound where the ultrasound is irradiated. The tactile sensation is also provided to a user whose operation is disapproved by the operation-controlling unit 102. The patterns included in the tactile information do not necessarily include changes, but also include the cases where the intensity of the ultrasound, irradiation position and the like are constant, such as the case where a user contacts a flat surface with a finger from the front of the surface and the like Thus, the tactile information is applicable not only when the user tries to touch the object, but also when the user is touched by the object. For example, when the object is a moving substance or a living creature such as a virtual character, the tactile sensation described above can be presented not only to the finger but also to an exposed part of a skin including a face.

The tactile-information-generating unit 106 may also be configured to correct a position irradiated with the ultrasound based on the temperature information input from the temperature information input device 24. This correction utilizes the temperature change of a finger of a user etc. and is performed by detecting the difference of the irradiation position and the intensity of the ultrasound due to the difference of the temperature of a finger of a user between the case where the irradiation position of ultrasound is appropriate and the case where the irradiation position of ultrasound is inappropriate. The correction may also be used to prevent painful sensation when ultrasound enters a void such as a finger gap or palm line.

By the way, the tactile-information-generating unit 106 outputs the tactile information within 50 ms, for example, within 10 ms, 20 ms, 30 ms, 40 ms, or within any number in between, after a position of a hand or a finger of the user is superimposed on a position of the object.

Furthermore, it is preferable to be able to present tactile sensation to a user within these times. In other words, it is preferable for a user to obtain tactile sensation within 50 ms after the user performs an action to touch the object.

By the way, the representation of tactile sensation may be realized not only necessarily by using mechanical stimulation by ultrasound, but also by appropriately using a movie, sound, or a combination of these. For this purpose, the acoustic information generator 107 generates acoustic information with respect to a generation of a sound effect corresponding to the operation of the object by a user and allows the acoustic output device 28 to make sound, thereby, allowing the user to perform a more intuitive operation.

Figure 14:
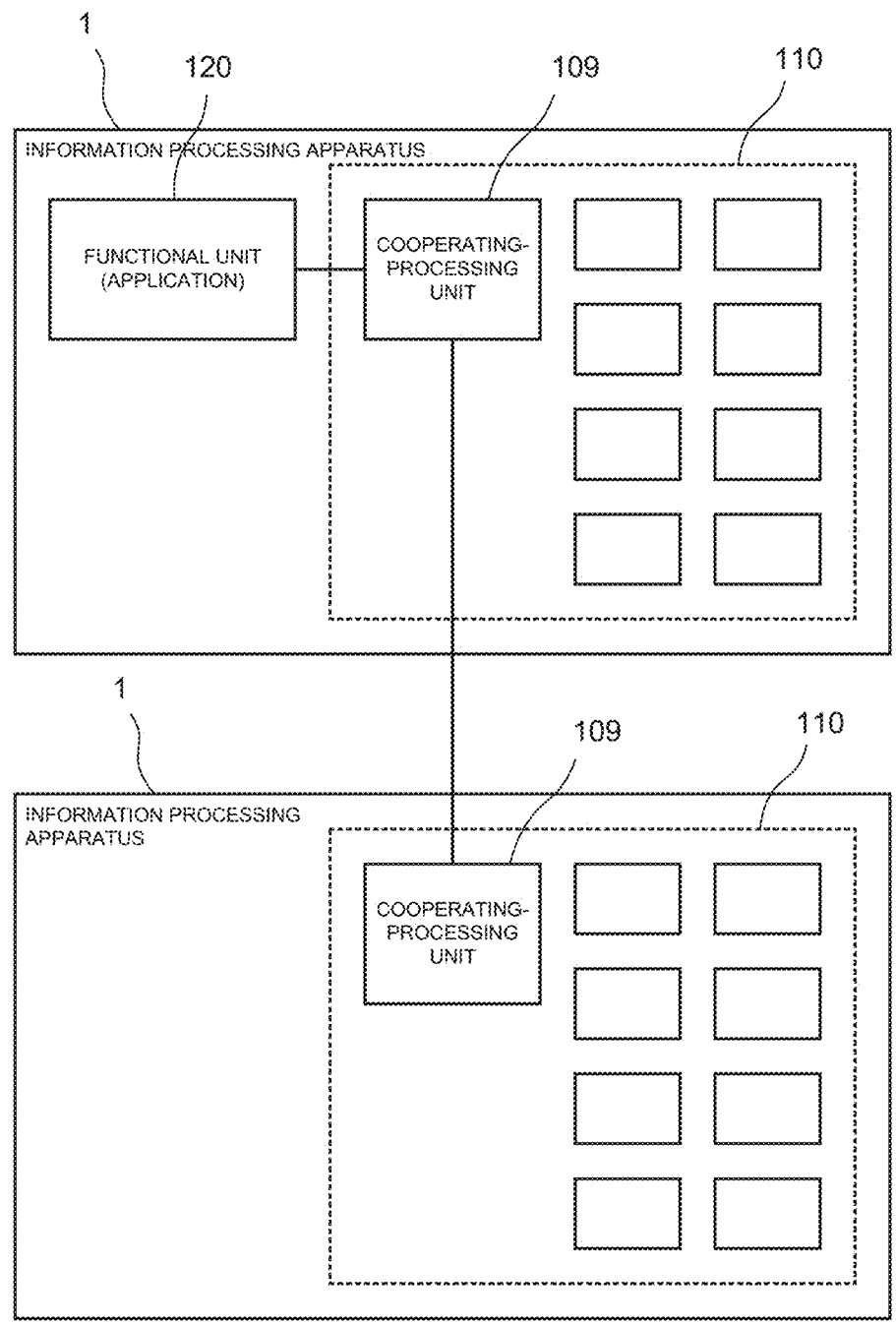
FIG. 14 illustrates a cooperating-processing unit 109.

Similarly, the airflow information generator 108 generates airflow information indicating the state of the airflow generated by the airflow output device 29 or the ultrasonic generator 27. The airflow is used, for example, to present the sensation of wind blowing when an object approaches a user, the sensation of being breathed on by a virtual character and the like The cooperating-processing unit 109 is configured to cooperate with other functional units. FIG. 14 illustrates a cooperating-processing unit 109. As shown in FIG. 14, the cooperating-processing unit 109 cooperates with at least one of a functional unit 120 and another information processing device 1. The functional unit 120 includes an independent functional unit from its own functional unit including the information-acquiring unit 101, the operation-controlling unit 102, the image-processing unit 103, the position-processing unit 104, the visual-information-generating unit 105, the tactile-information-generating unit 106, the acoustic-information-generating unit 107, the airflow-information-generating unit 108, and the cooperating-processing unit 109 and is realized by an operation of application software. This functional unit 120 is configured to replace at least a part of the information-acquiring unit 101, the image-processing unit 103, the position-processing unit 104, the visual-information-generating unit 105, and the tactile-information-generating unit 106. This functional unit 120 is, for example, realized by software application of a video game. In this case, a controller not shown in these figures may be connected to the information processing apparatus 1, so the controller connected to the information processing apparatus 1 may be alternatively used as the motion information input device 22 and the like. The cooperating-processing unit 109 can also cooperate with a plurality of functional units realized by a plurality of application software.

In addition, said another information processing apparatus 1 that the cooperative processing unit 109 cooperates with is the same as the information processing apparatus 1, and is configured to replace at least a part of the processor functioned as the information-acquisition unit 101, the image-processing unit 103, the position-processing unit 104, the visual-information-generating unit 105 and the tactile-information-generating unit 106. Of course, said another information processing apparatus 1 can also realize the functional unit realized by application software. The cooperating-processing unit 109 can also cooperate with a plurality of the information processing apparatuses 1.

5. Other

This system may be combined with existing actuators. For example, ultrasound may be irradiated to a user grasping a game controller so as to present tactile sensation in addition to the tactile sensation reproduced by the game controller.

The ultrasound generator 27 may be covered with a substance which can transmit sound waves, for example, a mesh-like sheet. Any coloring may be applied on the surface of this object which can transmit sound waves, thereby preventing the design from being compromised at the site where the ultrasound generator 27 is laid.

The present invention may be provided in each of the following aspects.

(1) An information processing apparatus comprising a processor configured to execute a program so as to: as an information-acquiring unit, acquire viewpoint information, motion information and object information, wherein: the viewpoint information includes information indicating a field of view of a user; the motion information is information indicating a motion of an irradiation target with ultrasound, and the object information includes at least one of coordinates, shape, surface condition, solidity, temperature, mass and friction coefficient of the object; as an image-processing unit, process an object image wherein: the object image is an image representing a virtual substance and is updated based on the viewpoint information and the motion information; as a position-processing unit, calculate a position when superimposing a background image and the object image, wherein: the background image is an image according to the field of view of the user; as a visual-information-generating unit, generate visual information superimposing the background image and the object image based on the position calculated by the position-processing unit, and output the generated visual information to a display device; and as a tactile-information-generating unit, generate tactile information for an ultrasound generator irradiating the user with ultrasound corresponding to the object based on the position calculated by the position-processing unit, the motion information and the object information, and output the generated tactile information to the ultrasound generator.

(2) The information processing apparatus according to (1), wherein: the processor is further configured to execute the program so as to, as a cooperating-processing unit, cooperate with at least one of a functional unit and another information processing apparatus, wherein: the functional unit is realized by an operation of application software and is configured to replace at least a part of the processor functioned as the information-acquisition unit, the image-processing unit, the position-processing unit, the visual-information-generating unit and the tactile-information-generating unit, and said another information processing apparatus is configured to replace at least a part of the processor functioned as the information-acquisition unit, the image-processing unit, the position-processing unit, the visual-information-generating unit and the tactile-information-generating unit.

(3) The information processing apparatus described in (1) or (2), wherein: the viewpoint information is an image captured by a camera, and the background image is the captured image.

(4) The information processing apparatus described in (1) or (2), wherein: the background image is a pre-captured or generated image and is updated based on the viewpoint information, and the processor is further configured to execute the program so as to: as the image-processing unit, process the background image, a user image and the object image, wherein: the user image is an image representing a hand including a thumb or a finger of the user and is updated based on the motion information; as the position-processing unit, calculate a position when superimposing the background image, the user image and the object image; and as the visual-information-generating unit, generate visual information superimposing the background image, the user image and the object image based on the calculated position and output the generated visual information to a display device.

(5) The information processing apparatus described in any of (1) through (4), wherein: the object information includes environment-corresponding information corresponding to each of a plurality of environments, and the processor is configured to execute the program so as to, as the position-processing unit, calculate a position when superimposing the background image and the object image so as to correspond to an environment corresponding to the field of view of a user, based on the environment-corresponding information and the viewpoint information.

(6) The information processing apparatus described in any of (1) through (4), wherein: the tactile information includes a temporal pattern in at least one of an amplitude variation frequency, intensity, phase and an irradiation position of ultrasound.

(7) The information processing apparatus described in (6), wherein: the temporal pattern is a pattern according to a shape of the object.

(8) The information processing apparatus described in (6) or (7), wherein: the temporal pattern is a pattern according to a surface state or material of the object.

(9) The information processing apparatus described in any of (1) through (8), wherein: the processor is configured to execute the program so as to, as the image-processing unit, update the object image in such a manner that the object becomes a state in which an operation including motion, rotation, deformation, division or combination is performed based on the motion information.

(10) The information processing apparatus described in (9), wherein: the processor is further configured to execute the program so as to, as an acoustic-information-generating unit, generate acoustic information with respect to a generation of a sound effect corresponding to the operation.

(11) The information processing apparatus described in (9) or (10), wherein: the processor is configured to execute the program so as to, as an operation-controlling unit, control whether or not the operation is performed.

(12) The information processing apparatus according to (11), wherein: the processor is configured to execute the program so as to: as the visual-information-generating unit, allow the visual information to include an approval object corresponding to approval of the operation and a disapproval object corresponding to disapproval of the operation; and as the operation-controlling unit, approve the operation in response to pressing the approval object and disapprove the operation in response to pressing the disapproval object.

(13) The information processing apparatus described in (12), wherein: the processor is configured to execute the program so as to: as the information-acquiring unit, acquire voice information, and as the operation-controlling unit, control whether or not the operation is performed according to the voice information.

(14) The information processing apparatus described in any of (1) through (13), wherein: the processor is configured to execute the program so as to: as the information-acquiring unit, acquire temperature information, wherein: the temperature information is information indicating temperature of the surface of the irradiation target; and as the tactile-information-generating unit, correct a position irradiated with the ultrasound based on the temperature information.

(15) The information processing apparatus described in (14), wherein: the processor is configured to execute the program so as to, as the information-acquiring unit, acquire the temperature information by means of a thermal camera or an infrared camera.

(16) The information processing apparatus described in any of (1) through (15), wherein: the processor is configured to execute the program so as to, as the tactile-information-generating unit, output the tactile information within 50 msec after a position of a hand or a finger of the user is superimposed on a position of the object.

(17) A non-transitory computer-readable media storing a program, wherein: the program allows a computer to function as the information processing apparatus described in any of (1) through (16).

Of course, the above aspects are not limited thereto.

What is claimed is:

1. An information processing apparatus comprising a processor configured to execute a program so as to:
as an information-acquiring unit, acquire viewpoint information, motion information, an object image representing an object, and object information relating to the object, wherein:
the viewpoint information includes information indicating a field of view of a user,
the motion information is information indicating a motion of an irradiation target with ultrasound, and
the object information includes at least one of a coordinate, a shape, a surface condition, solidity, a temperature, a mass, and a friction coefficient of the object;
as an image-processing unit, process the object image based on the object information, the viewpoint information, and the motion information so as to update a position, a direction, or the shape of the object according to physical interaction;
as a position-processing unit, calculate a position when superimposing a background image and the updated object image, wherein:
the background image is an image according to the field of view of the user;
as a visual-information-generating unit, generate visual information superimposing the background image and the updated object image based on the position calculated by the position-processing unit, and output the generated visual information to a display device; and
as a tactile-information-generating unit, generate tactile information for an ultrasound generator irradiating the user with the ultrasound corresponding to the object based on the position calculated by the position-processing unit, the motion information, and the object information, and output the generated tactile information to the ultrasound generator,
wherein the processor is configured to execute the program so as to:
determine a point of load against the object based on an operation of the visual information; and
as the tactile-information-generating unit, generate the tactile information for the ultrasound generator irradiating the user with the ultrasound corresponding to the object based on the physical interaction at the point of load.

2. The information processing apparatus according to claim 1, wherein:
the processor is further configured to execute the program so as to, as a cooperating-processing unit, cooperate with at least one of a functional unit and another information processing apparatus, wherein:
the functional unit is realized by an operation of application software and is configured to replace at least a part of the processor functioned as the information-acquisition unit, the image-processing unit, the position-processing unit, the visual-information-generating unit, and the tactile-information-generating unit, and
the another information processing apparatus is configured to replace at least a part of the processor functioned as the information-acquisition unit, the image-processing unit, the position-processing unit, the visual-information-generating unit, and the tactile-information-generating unit.

3. The information processing apparatus according to claim 1, wherein:
the viewpoint information is an image captured by a camera, and
the background image is the captured image.

4. The information processing apparatus according to claim 1, wherein:
the background image is a pre-captured or generated image and is updated based on the viewpoint information, and
the processor is further configured to execute the program so as to:
as the image-processing unit, process the background image, a user image, and the object image, wherein:
the user image is an image representing a hand including a thumb or a finger of the user and is updated based on the motion information;

as the position-processing unit, calculate the position when superimposing the background image, the user image, and the object image; and
as the visual-information-generating unit, generate the visual information superimposing the background image, the user image, and the object image based on the calculated position and output the generated visual information to the display device.

5. The information processing apparatus according to claim 1, wherein:
the object information includes environment-corresponding information corresponding to each of a plurality of environments, and
the processor is configured to execute the program so as to, as the position-processing unit, calculate the position when superimposing the background image and the object image so as to correspond to one environment of the plurality of environments corresponding to the field of view of the user, based on the environment-corresponding information and the viewpoint information.

6. The information processing apparatus according to claim 1, wherein:
the tactile information includes a temporal pattern in at least one of an amplitude variation frequency, an intensity, a phase, and an irradiation position of the ultrasound.

7. The information processing apparatus according to claim 6, wherein:
the temporal pattern is a pattern according to the shape of the object.

8. The information processing apparatus according to claim 6, wherein:
the temporal pattern is a pattern according to the surface condition or a material of the object.

9. The information processing apparatus according to claim 1, wherein:
the physical interaction includes dynamical interaction on the object, and
the processor is configured to execute the program so as to, as the image-processing unit, update the object image in such a manner that the object becomes a state in which an operation inducing distortion on the object is performed based on the motion information.

10. The information processing apparatus according to claim 1, wherein:
the processor is further configured to execute the program so as to:
as the image-processing unit, update the object image in such a manner that the object becomes a state in which an operation including motion, rotation, deformation, division, or combination is performed based on the motion information; and
as an acoustic-information-generating unit, generate acoustic information with respect to a generation of a sound effect corresponding to the operation.

11. The information processing apparatus according to claim 9, wherein:
the processor is configured to execute the program so as to, as an operation-controlling unit, control whether or not the operation is performed.

12. The information processing apparatus according to claim 11, wherein:
the processor is configured to execute the program so as to:
as the visual-information-generating unit, allow the visual information to include an approval object corresponding to approval of the operation and a disapproval object corresponding to disapproval of the operation; and
as the operation-controlling unit, approve the operation in response to pressing the approval object and disapprove the operation in response to pressing the disapproval object.

13. The information processing apparatus according to claim 12, wherein:
the processor is configured to execute the program so as to:
as the information-acquiring unit, acquire voice information, and
as the operation-controlling unit, control whether or not the operation is performed according to the voice information.

14. The information processing apparatus according to claim 1, wherein:
the processor is configured to execute the program so as to, as the tactile-information-generating unit, output the tactile information within 50 msec after a position of a hand or a finger of the user is superimposed on a position of the object.

15. A non-transitory computer-readable media storing a program, wherein:
the program allows a computer to function as the information processing apparatus according to claim 1.

16. The information processing apparatus according to claim 1, wherein
the physical interaction includes dynamical interaction on the object.

17. An information processing apparatus comprising a processor configured to execute a program so as to:
as an information-acquiring unit, acquire viewpoint information, motion information, and object information relating to an object, wherein:
the viewpoint information includes information indicating a field of view of a user,
the motion information is information indicating a motion of an irradiation target with ultrasound, and
the object information includes at least one of a coordinate, a shape, a surface condition, solidity, a temperature, a mass, and a friction coefficient of the object;
as an image-processing unit, process an object image wherein:
the object image is an image representing a virtual substance and is updated based on the viewpoint information and the motion information;
as a position-processing unit, calculate a position when superimposing a background image and the object image, wherein:
the background image is an image according to the field of view of the user;
as a visual-information-generating unit, generate visual information superimposing the background image and the object image based on the position calculated by the position-processing unit, and output the generated visual information to a display device; and
as a tactile-information-generating unit, generate tactile information for an ultrasound generator irradiating the user with the ultrasound corresponding to the object based on the position calculated by the position-processing unit, the motion information, and the object information, and output the generated tactile information to the ultrasound generator, wherein:

the processor is configured to execute the program so as to:
as the information-acquiring unit, acquire temperature information, wherein:
the temperature information is information indicating a temperature of a surface of the irradiation target; and
as the tactile-information-generating unit, correct a position irradiated with the ultrasound based on the temperature information.

18. The information processing apparatus according to claim 17, wherein:
the processor is configured to execute the program so as to, as the information-acquiring unit, acquire the temperature information by a thermal camera or an infrared camera.

19. An information processing method executed by an information processing, apparatus for causing a processor to execute a process, the information processing method comprising executing on the processor the steps of:
acquiring viewpoint information, motion information, an object image representing an object, and object information relating to the object, wherein:
the viewpoint information includes information indicating a field of view of a user,
the motion information is information indicating a motion of an irradiation target with ultrasound, and
the object information includes at least one of a coordinate, a shape, a surface condition, solidity, a temperature, a mass, and a friction coefficient of the object;

processing the object image based on the object information, the viewpoint information, and the motion information so as to update a position, a direction, or the shape of the object according to physical interaction;

calculating a position when superimposing a background image and the updated object image, wherein:
the background image is an image according to the field of view of the user;

generating visual information superimposing the background image and the updated object image based on the calculated position and outputting the generated visual information to a display device; and generating tactile information for an ultrasound generator irradiating the user with the ultrasound corresponding to the object based on the calculated position, the motion information, and the object information, and outputting the generated tactile information to the ultrasound generator, wherein the processor is further configured to:
determine a point of load against the object based on an operation of the visual information; and
generate the tactile information for the ultrasound generator irradiating the user with the ultrasound corresponding to the object based on the physical interaction at the point of load.

* * * * *